No. 638,684. Patented Dec. 12, 1899.
C. T. ADAMS.
VEHICLE TIRE.
(Application filed Oct. 12, 1898.)
(No Model.)
Fig. I.
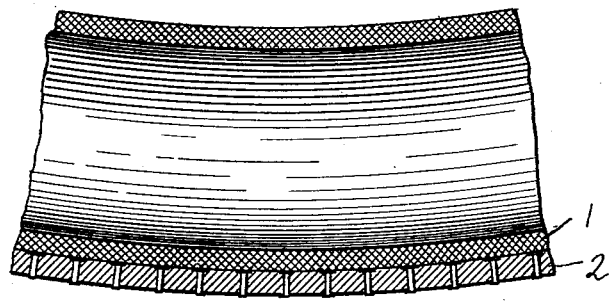
Fig. II.      Fig. III.
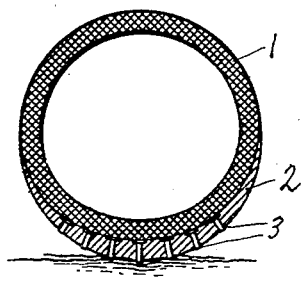 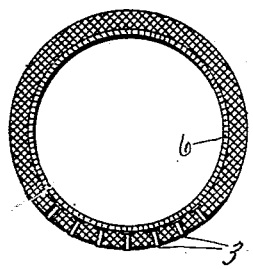
Fig. IV.   Fig. V.    Fig. VI.   Fig. VII.   Fig. VIII.
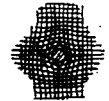 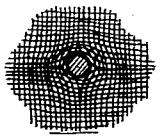 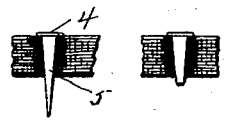
Fig. IX.   Fig. X.
 
WITNESSES:
H. M. Seamans
Roscoe Sargent
INVENTOR
Calvin Thayer Adams
BY
Alfred Wilkinson
ATTORNEY
THE NORRIS PETERS CO., PHOTO-LITHO., WASHINGTON, D. C.

UNITED STATES PATENT OFFICE.

CALVIN THAYER ADAMS, OF NEW YORK, N. Y.

VEHICLE-TIRE.

SPECIFICATION forming part of Letters Patent No. 638,684, dated December 12, 1899.

Application filed October 12, 1898. Serial No. 693,273. (No model.)

*To all whom it may concern:*

Be it known that I, CALVIN THAYER ADAMS, of the city of New York, in the county of New York, in the State of New York, have invented new and useful Improvements in Vehicle-Tires, of which the following, taken in connection with the accompanying drawings, is a full, clear, and exact description.

My invention relates to a special construction of elastic tire adapted to be applied to the rubber tires, pneumatic, cushion, and others, now in common use on bicycles and other vehicles to prevent the slipping of the wheels on wet and icy pavements, walks, and paths; and it consists in embedding in the tire in a peculiar manner rivets of peculiar construction.

My invention relates to the same subject-matter as those of my patents of August 16, 1898, but differs therefrom in the construction and arrangement of the various parts.

Before the time of my inventions there had been various attempts to accomplish the same general result; but these have all been unsuccessful, owing to defects in method. These various prior constructions have been expensive and commonly injurious to the material. They have been suggested with pins, studs, tacks, or spikes secured to the tire and protruding therefrom a substantial distance to engage with the path or road. Where the surface is soft, these would bite into it and so retard the progress of the vehicle. Where hard, they would be pressed to one side, broken, and destroyed and often tearing or wearing the rubber or fabric by the leverage of the shank or head. Such tacks have been shown both straight and tapered. Where the straight are forced through the fabric, they injure it by breaking or tearing the threads. Where tapering and sufficiently sharp, they might be forced through without injuring the fabric; but the threads will not engage with the tapering tack with sufficient force to hold it in place. Another objection to such constructions is that these tacks or spikes were provided with a head or other form of inner or outer flange—sometimes both—so large that in the aggregate they covered a considerable portion of the inner and outer surface of the tire with metal, as with a coat of mail, the result being that the tire is stiffened and its resiliency seriously affected. In my experiments, extending over a number of years and covering all types of prior constructions, I have observed these disadvantages and have discovered that for a successful antislipping device it is necessary to use small rivets so embedded and held by the fabric of the tire that they will move with it and not slip therein or be forced inwardly therefrom. These rivets should have small thin heads resting in close contact with the inner face of the tire or supplementary tread-strip and with blunt points extending outwardly and lying substantially flush with the outer surface of the tire or protruding as little as possible therefrom, so that given a sufficient number of rivets to prevent slipping the minimum of both the inner and outer surfaces of the tire is covered or studded with metal. It is of great importance that the rivets should be so firmly held in the fabric as to maintain their position therein without the use of cement, &c., both while the tire is being prepared and after it is in use. If the rivets can be held by the pressure of the fibers of the fabric between which they are inserted without breaking any of them, they become almost integral with the fabric and do not interfere with its resiliency. They move with it instead of being pushed out from it by the pressure of the roadway. This of course is a *sine qua non,* for any antislipping or puncture-proof device which at all diminishes the elasticity of the tire cannot be used. This grip of the fibers is produced by forcing them away laterally from the rivet when it is inserted. Without this, as in case of ordinary tapering tacks or rivets inserted through holes cut for them, there would be no grip or lateral pressure thereon and they would be forced inwardly in riding, as in case of a soft inner tire. My present invention, embodying all these advantages, is constructed as follows: I take a strip of combined fabric and vulcanized rubber compound which is suitable for the tread of the tire of length sufficient entirely to encircle the pneumatic tire and of width sufficient to cover its tread portion and insert in it a sufficient number of small rivets having more or less tapering shanks and sharpened points which may be done by certain machines. These rivets are inserted with their heads forced against one surface of the strip, which is to be the inner, and their points protruding outwardly beyond the outer surface. These points are then cut off close to the surface of the strip. They are then subjected to considerable longitudinal pressure, which may be applied by roller, hammer, or other desirable means, a firm support being given to their heads on the back, by which the shanks are shortened and thickened with substantial uniformity from end to end, the outer point being blunt, but expanded or upset little, if any, by this pressure and slightly embedded in the outer surface of the fabric. By this means the rivets are firmly gripped in the fiber, becoming almost an integral part thereof, at least so that they do not interfere with its resiliency. The tread-strip is then secured to the tread of the tire by cement, lacing, or in any other desirable way, it being understood that cement is not necessary for the purpose of retaining the rivets in their positions.

While I prefer to secure the rivets in the tire or supplementary strip in the manner just described, yet substantially the same result may be accomplished by a slightly-different construction, by which the rivets will be held with sufficient firmness for ordinary use. I use a rivet having the portion of its shank next the head straight for a length about equal to the thickness of the fabric and an elongated sharp point extending therefrom. When this is inserted in the fabric, the tapering point presses aside and compresses the threads, so that they engage the straight portion of the shank with considerable force, it being understood that they will not grip sufficiently, but will slip on the tapering tack. This being done, the tapering point is cut off, leaving the blunt end of the straight portion of the shank about flush with the outer surface of the tire.

I have described my invention as applied to a supplementary tread-strip. It may be used with either single-tube or double-tube tires, and which on the whole I consider preferable; but it must be understood that my invention may be applied to double-tube tires without the supplementary strip, the rivets being inserted through the outer tube, their heads in close contact with the inner surface thereof and the thin inner tube expanded against them without danger of injury thereto.

I have thus carefully described my invention; but from the accompanying drawings, in which the particular parts are pointed out by the same reference-numerals in the various figures, it will be more clearly understood.

Figure I is a longitudinal section of a portion of a single-tube tire provided with a supplementary strip constructed according to my invention. Fig. II is a cross-section of the same. Fig. III is a corresponding cross-section showing my invention applied to the outer shoe of a double-tube tire. Figs. IV and V are diagrams showing, respectively, a rivet inserted in the fabric before and after longitudinal compression. Figs. VI, VII, and VIII show a rivet in the three conditions—when first inserted, after the point has been cut off, and after it has been longitudinally compressed. Figs. IX and X illustrate the described modification in which a rivet has the upper portion of its shank straight and the lower portion tapering, these figures showing the rivet in the two conditions before and after the tapering point has been cut off.

In the figures, 1 indicates the main tube of the tire, and 2 the supplementary strip, in which are inserted the rivets 3, having small flat thin heads 4 and sharp tapering shanks 5, as shown in Fig. VI, which when cut off, as shown in Fig. VII, and compressed assume the form shown in Fig. VIII. In Fig. III, showing a double-tube tire, the inner or air tube is indicated by 6. In Figs. IX and X the straight portion of the shanks is indicated by 7 and the tapering portion by 8.

My invention is especially adapted for use with pneumatic tires which are now in general use on bicycles; but it may be used on cushioned or hard-rubber tires or, in fact, on those of any other compressible material. While useful in any localities, they are of particular importance in cities, where the smooth pavements are particularly slippery from ice or water and even in dry weather are kept constantly wet by artificial means. Furthermore, there is greater danger to the rider in cities, in case he slips, from trolley-cars and other heavy and dangerous vehicles, so much so that some device of this sort seems absolutely required and has only not come into common use from the fact that all such previous devices either injure the tire or interfere with its resiliency, as aforesaid. It is well adapted to engage with the various sorts of stone pavements or with the smoother pavements, whether made of wood, asphalt, brick, &c. The blunt point does not stick into the roadway, no matter of what material constructed; but even in the smoothest pavements, like asphalt, there are some inequalities, with which the side edges of the blunt point engage laterally.

Another advantage of my invention is that it decreases the danger of punctures, the rivets protecting the tire and making it tougher to resist punctures when a sharp substance comes in contact with the tire either on the rivets or between them.

Having described my invention, what I claim as new, and desire to secure by Letters Patent, is—

1. In combination with an elastic tire, a tread-strip secured thereto, and inserted therein straight-shanked rivets having small, flat heads and blunt points, left by cutting off therefrom sharp tapering points, the rivets being held in position by the pressure of the fabric fibers against their straight sides, this pressure being produced by the forcing of the fibers out of their normal position by the pressure of the rivets themselves.

2. In a pneumatic or rubber tire, the combination of the outer tire or a supplementary fabric strip, studded with rivets having small, flat heads in close contact with the inner surface of the strip and shanks expanded by longitudinal pressure, and having blunt points substantially flush with the outer surface of the tire.

3. In combination with a rubber tire, the outer tube or a supplementary fabric strip, studded with rivets which are inserted through the fabric and then shortened and expanded by longitudinal compression to exert lateral pressure on the fiber of the fabric so as to retain the rivets by the pressure thereof.

In testimony whereof I have hereunto signed my name.

CALVIN THAYER ADAMS. [L. S.]

Witnesses:
ROLAND L. JANES,
ALFRED WILKINSON.